United States Patent
Lin

(10) Patent No.: US 7,382,537 B2
(45) Date of Patent: Jun. 3, 2008

(54) OPTICAL FILM HAVING PRISMATIC FACES DIRECTLY FORMED WITH MICRO-LENSES THEREON

(76) Inventor: Ching-Bin Lin, 2F-2, No. 12, Lane 88, Min-Sheng E. Road, Sec. 3, Taipei (TW)

( * ) Notice: Subject to any disclaimer, the term of this patent is extended or adjusted under 35 U.S.C. 154(b) by 69 days.

(21) Appl. No.: 11/513,949

(22) Filed: Sep. 1, 2006

(65) Prior Publication Data

US 2008/0055732 A1     Mar. 6, 2008

(51) Int. Cl.
*G02B 27/10* (2006.01)
(52) U.S. Cl. .................... 359/625; 359/599; 359/638
(58) Field of Classification Search .......... 359/599, 359/625, 638
See application file for complete search history.

(56) References Cited

U.S. PATENT DOCUMENTS

| 6,801,277 B2 * | 10/2004 | Ting et al. | 349/113 |
| 2004/0100699 A1 * | 5/2004 | Cowan et al. | 359/599 |

* cited by examiner

*Primary Examiner*—Hung X. Dang
*Assistant Examiner*—Joseph Martinez

(57) ABSTRACT

An optical film comprising: a transparent supporting (or base) layer; a prismatic layer consisting of a plurality of prisms integrally formed on the supporting layer; and a plurality of micro-lenses integrally formed on a plurality of prismatic faces of the prisms, whereby the incidence lights as refracted through the micro-lenses on the prisms will be refracted to be an outgoing light approximating the on-axes of the prisms, thereby increasing the on-axis brightness of the optical film.

1 Claim, 4 Drawing Sheets

OPTICAL FILM HAVING PRISMATIC FACES DIRECTLY FORMED WITH MICRO-LENSES THEREON

BACKGROUND OF THE INVENTION

A conventional optical film as shown in FIG. 1 comprises: a base layer B, and a prismatic layer P having a plurality of prisms arranged side by side and integrally formed on the base layer B.

In order to enhance the on-axis brightness of such a conventional optical film, plural design variables should be considered, namely, the variable angles, the orientations of the prisms, the additional light guiding elements if required, and other design factors, thereby increasing the production complexity and cost.

The present inventor has found the drawbacks of the prior art and invented the present optical film for enhancing the on-axis brightness thereof.

SUMMARY OF THE INVENTION

The object of the present invention is to provide an optical film comprising: a transparent supporting (or base) layer; a prismatic layer consisting of a plurality of prisms integrally formed on the supporting layer; and a plurality of micro-lenses integrally formed on a plurality of prismatic faces of the prisms, whereby the incidence lights as refracted through the micro-lenses on the prisms will be refracted to be an outgoing light approximating the on-axes of the prisms, thereby increasing the on-axis brightness of the optical film.

DETAILED DESCRIPTION

Figure 1:
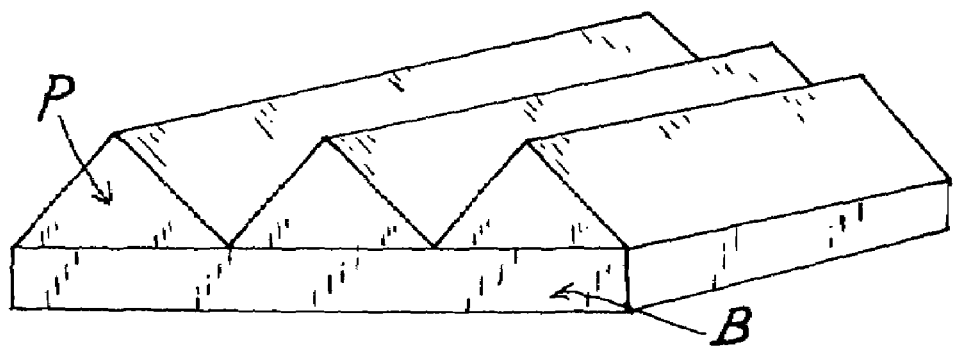
FIG. 1 shows a prior art of a conventional optical film.
Figure 2:
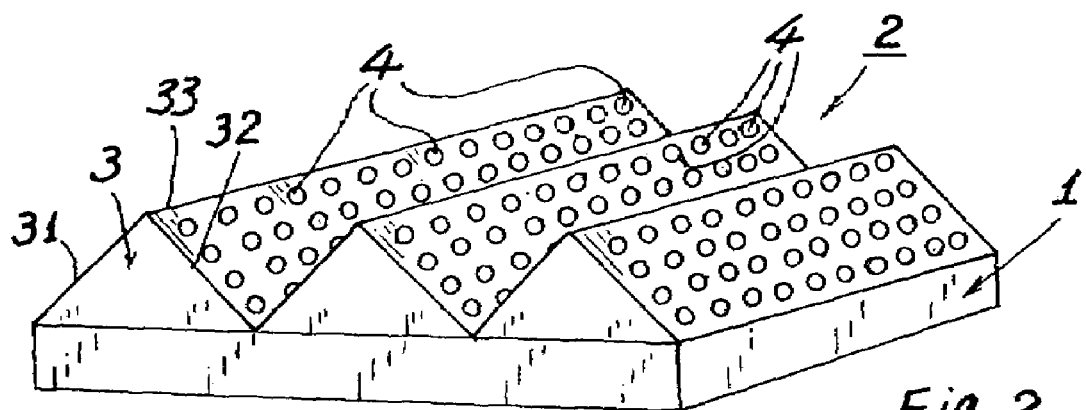
FIG. 2 is an illustration showing the optical film of the present invention.
Figure 3:
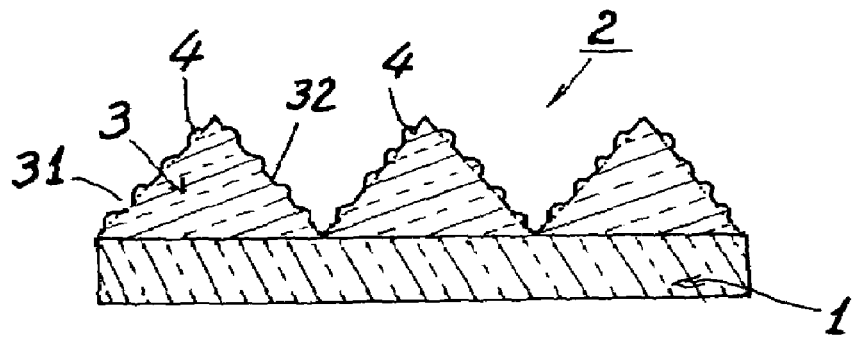
FIG. 3 is a sectional drawing of the present invention.
Figure 4:
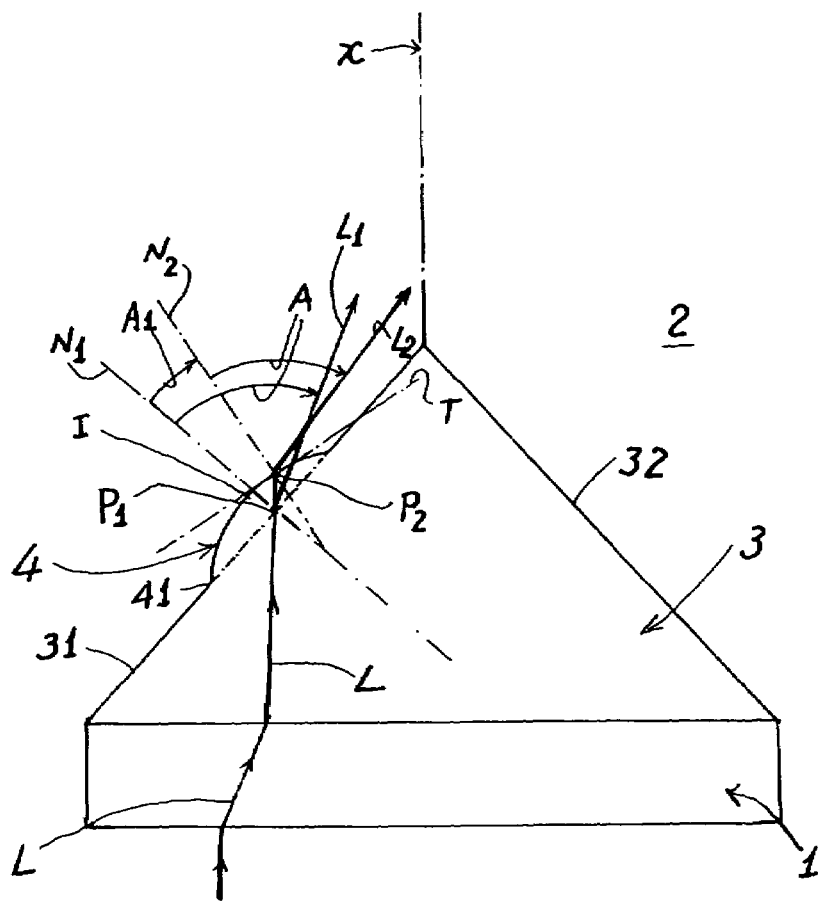
FIG. 4 is an illustration showing the light refraction path through the present invention in comparison with the prior art.

As shown in FIGS. 2~4, an optical film of the present invention comprises: a transparent supporting layer 1; and a prismatic layer 2 integrally formed on the supporting layer 1.

The prismatic layer 2 includes a plurality of prisms 3 each consisting of at least two prismatic faces 31, 32 tapered upwardly and integrally formed on the supporting layer 1.

Each prismatic face 31 or 32 is integrally formed thereon with a plurality of micro-lenses 4.

Each micro-lens 4 may be formed as convex lens or concave lens, not limited in the present invention.

Each micro-lens 4 has a cross section generally formed as arcuate, meniscus, semi-circular shape or any other shapes.

Each micro-lens 4 includes a lens base 41 coplanar to the prismatic face 31 or 32, and an inflection point I at a peak of the convex lens.

The micro-lenses 4 are integrally formed on the prisms 3, which are integrally formed on the supporting layer 1 by molding or imprinting process.

The transparent supporting layer 1 may be made of thermoplastic resin, including: polyethylene Terephthalate, polycarbonate, etc.

The prisms 3 and microlenses 4 may be made of photo-sensitive resin or photo-curable resin, or thermosetting resin, including UV-curable resin.

Other materials for making the optical film may be chosen, not limited in the present invention.

Figure 5:
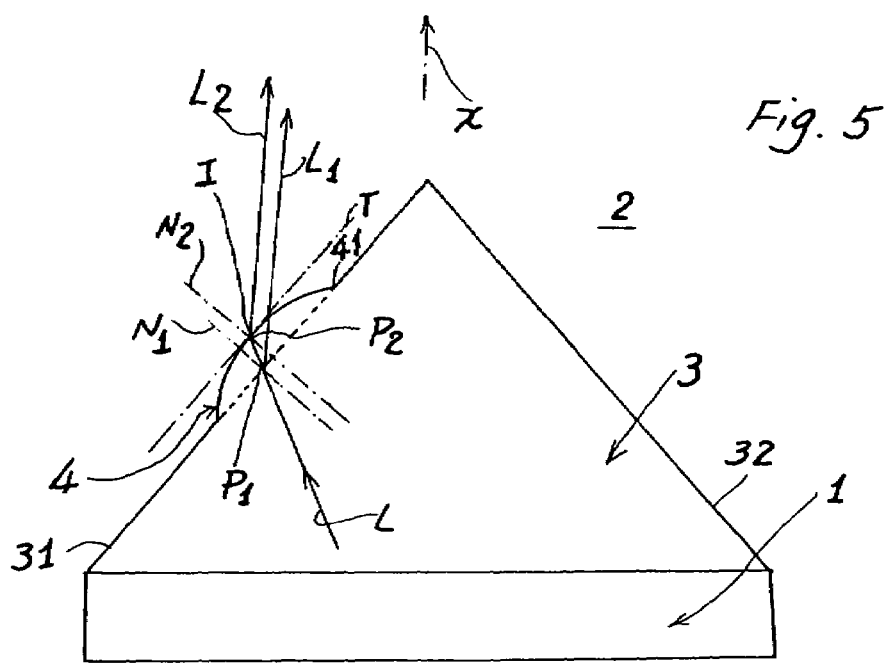
FIG. 5 shows another light refraction path through the present invention in comparison with the prior art.
Figure 6:
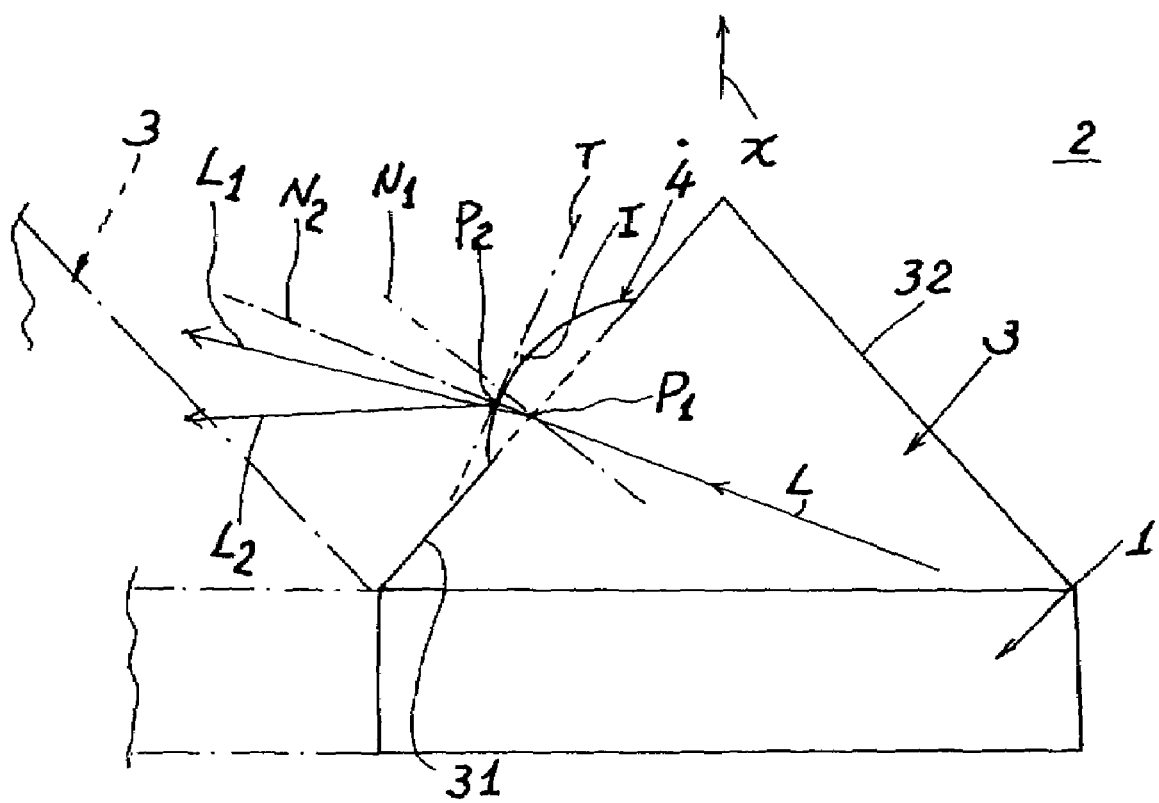
FIG. 6 shows still another light refraction path of the present invention in comparison with the prior art.

For explaining the light refraction path through the present invention in comparison with the prior art, FIGS. 4~6 are illustrated and described in detail hereinafter.

For clear illustration purpose, only one micro-lens 4 is formed on the prismatic face 31 or 32 of the prism 3 as shown in FIGS. 4~6. Practically, the number, shapes, lay-out or distribution of the micro-lenses 4 on the prism faces 31, 32 are not limited in the present invention.

As shown in FIG. 4, the incidence light L entering the prism 3 will be refracted at a first refraction point P1 at the prismatic face 31 (as shown in dotted line) in a refraction angle A deviated from the first normal line N1 to be a first outgoing light L1 projecting outwardly upwardly. In this situation, the micro-lens 4 of the present invention is not provided for the light path.

Comparatively, the incidence light L when entering the micro-lens 4 of the present invention will be refracted at a second refraction point P2 at the micro-lens face (deviated from the inflection point I rightwardly upwardly) in a refraction angle A deviated from the second normal line N2 to be a second outgoing light L2 projecting outwardly upwardly to approximate the on-axis X of the prism 3.

The second outgoing light L2 (with micro-lens 4) as effected by the present invention is approximating the on-axis X to be nearer than the first outgoing light L1 (without micro-lens 4), resulting in increase of on-axis brightness of the prism and optical film thus formed.

The second normal line N2 is perpendicular to a tangential line T which is tangential to the micro-lens 4 at second refraction point P2; namely both lines N2, T perpendicularly intersecting at the second refraction point P2. Since the second normal line N2 is already deviated from the first normal line N1 at an inclined angle A1, the second outgoing light L2, even being refracted with the same refraction angle A (the refractive index of microlens 4 being pre-set to be the same as that of the prism 3), will be more declined to the on-axis (X) direction. Namely, L2 is approximating to the on-axis X to be nearer than L1.

Therefore, the present invention may have increased on-axis brightness than that of the prior art in view of the aforementioned analysis and explanation.

As shown in FIG. 5, the incidence light L is projected to the inflection point I of the micro-lens 4 of the present invention. Since the second normal line N2 is parallel to the first normal line N1, the second outgoing light L2, after being refracted at the second refraction point P2 (P2=I), will thus be parallel to the first outgoing light L1 as refracted at the first refraction point P1 on the dotted line shown in FIG. 5. The first outgoing light L1 is refracted directly from the prismatic face 31 (without micro-lens 4 as effected by the present invention).

So, even the second outgoing light L2 is sharp refracted at the inflection point I of the micro-lens 4, it is still parallel to the first outgoing light L1. It means that the second light L2 is retracted through the micro-lens 4 of the present invention in a direction towards the on-axis X as same to that of the first light L1. So, the present invention, in this example, is not inferior to the prior art (without microlens), when comparing their on-axis brightness.

As shown in FIG. 6, the incidence light L is projected to a direction leftwardly deviated from the inflection point I of the micro-lens 4. The light L is then refracted at the second refraction point P2, which is perpendicularly intersected by the second normal line N2 and a tangential line T tangential to the micorlens 4 at second refraction point P2, to be the second outgoing light L2.

The incidence light L, if being refracted at the first refraction point P1 on the prism face 31 (without microlens 4 as shown in dotted line of FIG. 6), will be refracted to be a first outgoing light L1 as deviated from the first normal line N1.

Comparatively, the second light L2 of the present invention is declined downwardly than the first light L1, namely, L2 being deviated farther from the on-axis X than L1. Nevertheless, the second light L2 of the present invention is still projected into a neighboring prism 3, as dotted line shown in FIG. 6, to be "absorbed" by the neighboring prism, thereby causing no light loss by the present invention.

Accordingly, the present invention may increase the on-axis brightness to enhance the overall optical properties to be superior to the prior art.

Figure 7:
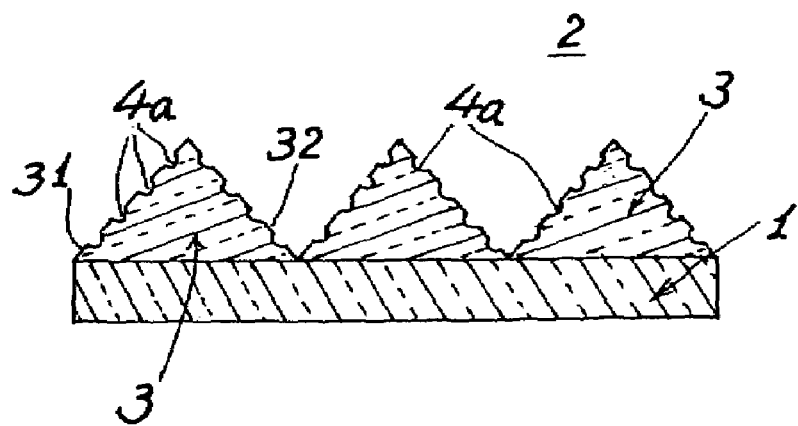
FIG. 7 is a sectional drawing of another preferred embodiment of the present invention.

Another preferred embodiment of the present invention is shown in FIG. 7, in which the micorlens 4 has been modified to be a concave micro-lens 4a curving inwardly from the prismatic face 31 or 32.

Figure 8:
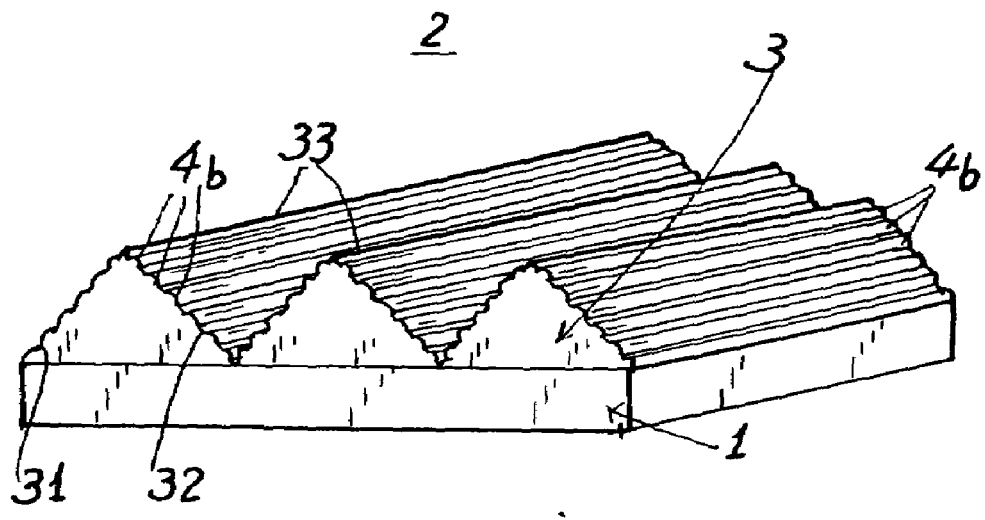
FIG. 8 shows still another preferred embodiment of the present invention.

As shown in FIG. 8, the micro-lenses 4 are each formed as a semi-cylindrical micro-lens 4b juxtapositionally formed on each prismatic face 31, 32 to be parallel to each ridge line 33 which is convergently intersected by the dihedral prismatic faces 31, 32 tapered upwardly.

Figure 9:
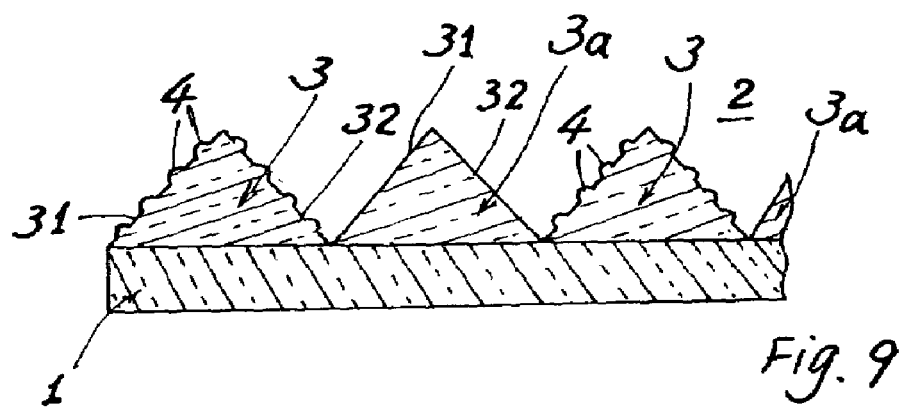
FIG. 9 is a modification of the present invention as modified from FIG. 3.

As shown in FIG. 9, the present invention is modified to form alternating prism 3 having micro-lenses 4 formed on the dihedral faces 31, 32 of the prism; and prism 3a, without forming micro-lens, alternatively formed on the supporting layer 1.

Figure 10:
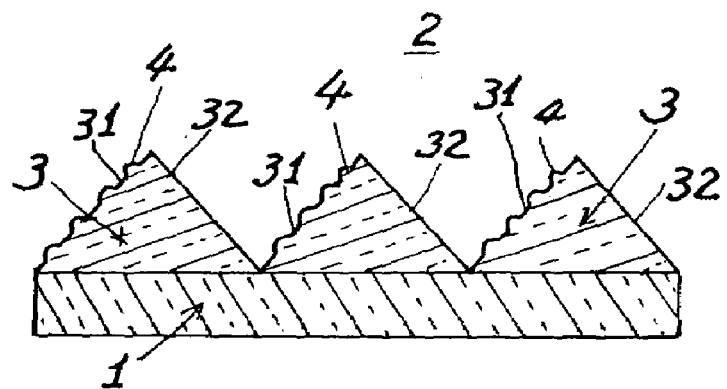
FIG. 10 shows another modification of the present invention as modified from FIG. 3.

As shown in FIG. 10, only one prismatic face 31 is formed with micro-lenses 4 thereon; while the other prismatic face 32 is not formed with micro-lens thereon.

The microlenses 4 of the present invention may also be formed on the prism faces of a tetrahedron (pyramid) prism.

The design factors or data of the micro-lenses 4 of the present invention are not limited, such as: size, shapes, height, pitches, curvatures, distribution density or lay-out on the prism face, continuous or discontinuous forming on the prism face, etc.

The refractive index of the microlenses 4 is preferably same as that of the prism 3. However, their refractive index may be different from each other.

The present invention may be modified without departing from the spirit and scope of the present invention.

I claim:
1. An optical film comprising:
  a transparent supporting layer;
  a prismatic layer consisting of a plurality, of prisms integrally formed on said transparent supporting layer; each said prism having a plurality of prismatic faces; and each said prismatic face having a plurality of micro-lenses formed on said prismatic face; and
  each said microlens curved convexly outwardly from said prismatic face of each said prism, and having an inflection point formed on a peak of each said micro-lens.

* * * * *